United States Patent [19]
Hoffman

[11] 3,876,497
[45] Apr. 8, 1975

[54] PAPER MILL WASTE SLUDGE OXIDATION AND PRODUCT RECOVERY

[75] Inventor: Clarence A. Hoffman, Rothschild, Wis.

[73] Assignee: Sterling Drug, Inc., New York, N.Y.

[22] Filed: July 16, 1973

[21] Appl. No.: 379,701

Related U.S. Application Data
[63] Continuation of Ser. No. 201,397, Nov. 23, 1971, abandoned.

[52] U.S. Cl. .............. 162/189; 162/DIG. 9; 210/63
[51] Int. Cl. ........................... D21f 1/66; C02c 5/04
[58] Field of Search............... 162/189, 190, DIG. 9; 210/63, 71

[56] References Cited
UNITED STATES PATENTS

| | | | |
|---|---|---|---|
| 2,903,425 | 9/1959 | Zimmerman | 210/63 |
| 3,060,118 | 10/1962 | Schoeffel | 210/63 X |
| 3,235,444 | 2/1966 | Kruger | 162/190 |
| 3,359,200 | 12/1967 | Gitchel et al. | 210/63 |
| 3,576,710 | 4/1971 | Mader et al. | 162/190 X |
| 3,649,534 | 3/1972 | Schotte | 210/63 |

OTHER PUBLICATIONS

Schoeffel et al., "Das Nassluft-Oxgdationsuerfahren und seine Anwendung in der Industriellen Abfallbeseitigung," Wasser Luft and Betried, Vol. 10, pp. 2–6, August, 1966.

Primary Examiner—S. Leon Bashore
Assistant Examiner—Richard V. Fisher
Attorney, Agent, or Firm—Thomas L. Johnson; B. Woodrow Wyatt

[57] ABSTRACT

Paper mill waste sludges are subjected to wet air oxidation whereby organic materials are converted to innocuous oxidation products, and the inorganic filler materials, e.g., titanium dioxide, clay and the like, are recovered in a form suitable for reuse.

2 Claims, 1 Drawing Figure

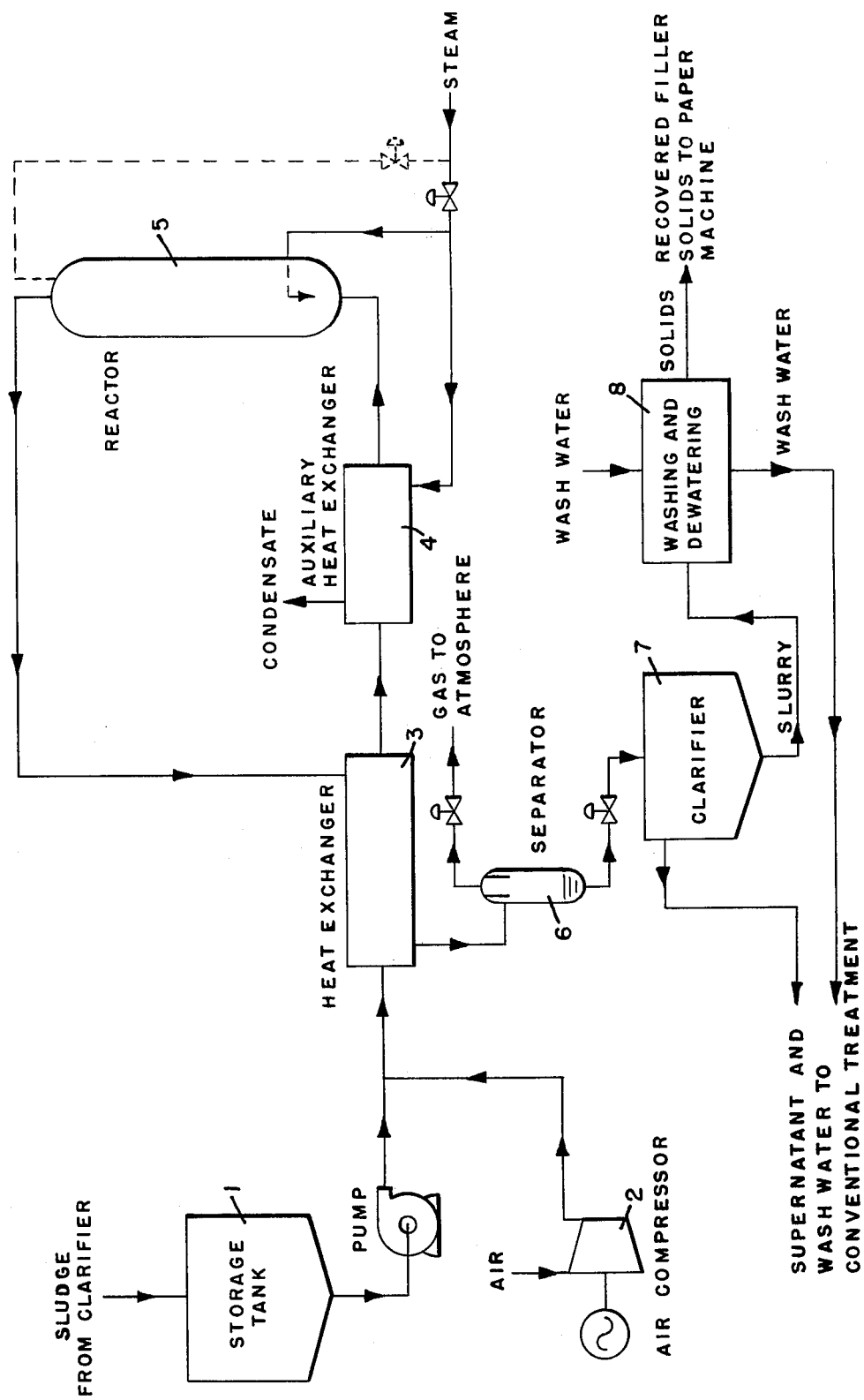

PAPER MILL WASTE SLUDGE OXIDATION AND PRODUCT RECOVERY

The application is a continuation-in-part of copending application Ser. No. 201,397, filed Nov. 23, 1971, now abandoned.

This invention relates to a process for the recovery of inorganic filler materials from paper mill waste sludges by a wet air oxidation process.

Inorganic filler materials are added to cellulose fiber in the paper making process in order to modify certain physical properties, especially to enhance the whiteness and opacity of the paper. Such filler materials, also called pigments, include aluminum silicate (China clay), calcium carbonate, zinc oxide, aluminum hydroxide, zinc sulfide, titanium dioxide, calcium sulfate, calcium sulfite, barium sulfate (blanc fixe), hydrated magnesium silicate (talc), silica, and mixtures of two or more of the foregoing. The preferred and most commonly used fillers are aluminum silicate, titanium dioxide and calcium carbonate.

In conventional paper making processes the pulp fiber and fillers are dispersed in water and run on to a paper machine wire. A certain amount of the solid material is not retained but passes through the wire along with the water used for suspending the fibers and fillers. This effluent is known as "white water" and, although it can be reused to a certain extent, it must eventually be disposed of. Generally, the white water is passed through a clarifier or other type of sedimentation device before being discharged. In the clarifier a sludge accumulates which contains waste fiber, filler and other organic material. This sludge, unless processed, represents a loss to the paper mill and also presents a waste disposal problem.

The filler in the waste sludge is not reusable as such since it is contaminated with waste fiber and other organic material. The organic fraction must be removed before the fillers can be used again. Conventional incineration of the sludge destroys the fibers and other organic matter but results in undesirable chemical and physical changes in the filler materials. For example, upon conventional burning, clay becomes abrasive and, if reused, results in excessive wear of the wire of the paper making machines. Furthermore, if calcium carbonate is present, incineration converts it to calcium oxide which is not useful per se as a filler. Incineration also produces objectionable air pollution and losses of the filler material.

In the process of the present invention, the inorganic filler materials are recovered substantially completely from paper mill waste sludges, suitable for reuse, by heating said waste sludges with an oxygen containing gas (pure oxygen or oxygen mixed with inert gas, e.g., air) at a temperature between 160° and 375°C. and at a corresponding pressure which will maintain most of the water content of the sludge in the liquid phase, between about 500 and 3,500 psig, directly proportional to the temperature used, and then separating the gas, liquid and solid phases, the last being the recovered filler material suitable for reuse. If pure oxygen is used, pressures in the lower part of the above-mentioned range are used. A preferred temperature range for the oxidation process when air is used is from 225° to 320°C. The oxidation is carried out for a time necessary to effect maximum reduction of COD (chemical oxygen demand) under the conditions used and to produce a recovered filler having a brightness of at least about 80 percent G.E. (General Electric measurement). The oxidation time varies from about 0.25 to 5 hours, inversely proportional to the temperature and pressure conditions.

The "wet air oxidation" of the paper mill sludge converts the waste fiber and other organic materials to carbon dioxide or to low molecular weight organic compounds which are water soluble and readily removed by simple washing procedures.

The paper making fillers suitable for recovery in the process of the invention are those which are refractory and are not altered chemically by the process, and this includes any of the fillers named hereinabove, the preferred fillers being aluminum silicate, titanium dioxide and calcium carbonate.

Suitable paper making fillers must also be white in color. Thus, the inorganic ash obtained by wet air oxidation of sewage sludge (Schoeffel U.S. Pat. No. 3,060,118), which ash is of widely varying chemical constitution, is dark in color and therefore completely unsuitable as a paper filler.

The accompanying drawing is a schematic flow diagram showing a system for carrying out the process of the present invention. Paper mill sludge from a clarifier is transferred to a storage tank 1. From the storage tank, the sludge is pumped into the system where it is mixed with air provided by a compressor 2. The mixture of air and sludge passes through one or more heat exchangers 3 and 4 and into a reactor 5. Steam for start-up or continuous use may be added indirectly to the process by means of heat exchanger 4 as shown or may be injected directly into the reactor. Also, steam may be injected into the reactor as a means of rapid start-up and thereafter utilized in the auxiliary heat exchanger, thus conserving the condensate.

Oxidized material exiting from the reactor 5 passes through the heat exchanger 3 and into a separator 6. From the separator, the gaseous phase passes into the atmosphere, preferably by way of a purifying device such as a scrubber, catalyst, activated carbon tower or the like. The liquid phase containing suspended filler material is transferred to a clarifier 7 where the solid material settles and is withdrawn from the bottom of the clarifier as a slurry. The slurry is transferred to a washing and dewatering vessel 8 to afford the recovered filler suitable for reuse as an additive for fresh cellulose fiber in the paper making machine. The supernatant liquor from the clarifier 7 and waste water from vessel 8 are combined for conventional treatment and disposal.

The following examples will further illustrate the invention without the latter being limited thereby.

EXAMPLE 1

One liter of mill sludge, obtained from a paper making process employing clay and titanium dioxide as fillers, and containing 60 g. of solids was oxidized with air in an autoclave at 250°C. The oxidized material was centrifuged and the solids washed with approximately 700 ml. of fresh water. The solids (about 28 g.) were used to make a sample sheet of paper and were found to be just as satisfactory as new and unused clay and titanium dioxide.

EXAMPLE 2

Mill sludge, obtained from a paper making process employing clay and titanium dioxide as fillers, was oxidized with air in an autoclave at 300°C. and 3,000 psig for a period of about 2½ hours. The oxidized mixture was centrifuged and the solid fraction separated. The recovered filler had a G.E. brightness value of 83 percent, whereas the average brightness of the feed slurry solids was 62 percent.

EXAMPLE 3

Mill sludge, obtained from a paper making process employing clay and titanium dioxide as fillers, and comprising a slurry of 61.9 g/l total solids and a chemical oxygen demand of 39.2 g/l, was oxidized with air in an autoclave at 299°C. and 3,000 psig for about 2½ hours. The oxidized slurry, which contained 33.5 g/l total solids and a chemical oxygen demand of 8.6 g/l, was centrifuged and the solid fraction separated. The resulting cake had a total solids content of 25.4 grams per liter and a chemical oxygen demand of 0.3 grams per liter of original slurry volume. The filler thus recovered had a G.E. brightness value of 82.3 percent, whereas the solid fraction obtained from centrifugation of the original unoxidized slurry had a G.E. brightness value of 64.5 percent.

I claim:

1. The process for substantially complete recovery of inorganic paper making filler materials from paper mill waste sludge, which comprises heating said waste sludge with an oxygen containing gas at a temperature between 160° and 375°C. and at a corresponding pressure of between 500 and 3,500 psig which will maintain most of the water content of the sludge in the liquid phase, and a corresponding oxidation time of between 0.25 and 5 hours; separating the gas, liquid, and solid phases; washing and dewatering the solid to give regenerated filler material, free of cellulose fibers and other organic contaminants, having a brightness of at least about 80 percent G.E. and suitable for reuse as a filler material in the paper making process, so that substantially complete recovery of said filler materials is achieved.

2. A process according to claim 1 in which the oxidation temperature lies between 200° and 320°C.

* * * * *